US006080253A

United States Patent [19]

Hitch

[11] Patent Number: 6,080,253

[45] **Date of Patent: *Jun. 27, 2000**

[54] METHOD AND APPARATUS FOR SEALING CONTAINERS

[75] Inventor: John R. Hitch, Indianapolis, Ind.

[73] Assignee: Beckman Coulter, Inc., Fullerton, Calif.

[ * ] Notice: This patent is subject to a terminal disclaimer.

[21] Appl. No.: 09/179,759

[22] Filed: Oct. 27, 1998

Related U.S. Application Data

[63] Continuation of application No. 08/865,354, May 29, 1997, Pat. No. 5,851,346.

[51] Int. Cl.[7] .............................. B32B 31/20; B65B 7/28

[52] U.S. Cl. ............................ 156/69; 156/249; 156/285; 156/541; 156/566; 156/580; 53/485; 53/389.1

[58] Field of Search .............................. 156/69, 249, 361, 156/362, 541, 542, 566, 580, 285; 53/471, 485, 389.1

[56] References Cited

U.S. PATENT DOCUMENTS

| | | | |
|---|---|---|---|
| 4,595,447 | 6/1986 | Lindstrom . | |
| 4,822,442 | 4/1989 | Ashcraft et al. | 156/541 |
| 4,842,660 | 6/1989 | Voltmer et al. . | |
| 4,867,315 | 9/1989 | Baldwin . | |
| 4,994,129 | 2/1991 | Nakagaki . | |
| 5,277,741 | 1/1994 | Kramer . | |
| 5,297,375 | 3/1994 | Reil et al. . | |
| 5,623,816 | 4/1997 | Edwards et al. | 53/471 |
| 5,851,346 | 12/1998 | Hitch | 156/542 |
| 5,916,812 | 6/1999 | Chen et al. | 156/69 |

FOREIGN PATENT DOCUMENTS

| | | |
|---|---|---|
| 0283750 | 9/1988 | European Pat. Off. . |
| 1510093 | 5/1978 | United Kingdom . |

*Primary Examiner*—Michael W. Ball
*Assistant Examiner*—Michael A Tolin
*Attorney, Agent, or Firm*—William H. May; Margaret A. Kivinski; Ice Miller Donadio & Ryan

[57] ABSTRACT

The present invention fulfills the above stated needs, as well as others, by providing a automated container sealing apparatus that automatically removes seals from a backing and applies the seals to the container. The seals are pre-cut and have a size corresponding to the size of the container. In an exemplary embodiment, the present invention includes an apparatus for sealing containers, the containers defined by a generally planar sealing surface and one or more receptacles, wherein each of the one or more receptacles include an opening coplanar with and defining corresponding openings in the sealing surface. The container sealing apparatus comprises: a plurality of seals, each of said plurality of seals having a shape corresponding to the sealing surface, the plurality of seals peelably affixed to a length of backing; a movable vacuum platen for removing a seal comprising one of the plurality of seals from the backing and transporting the removed seal to a container; and a movable container support for causing the container to engage the seal, thereby sealing the container.

14 Claims, 6 Drawing Sheets

METHOD AND APPARATUS FOR SEALING CONTAINERS

CROSS-REFERENCE TO RELATED APPLICATIONS

This application is a continuation of prior, patent application Ser. No. 08/865,354 filed May 29, 1997, now U.S. Pat. No. 5,851,346.

FIELD OF THE INVENTION

The present invention relates generally to automated processes, and particularly, to container sealing apparatus for use in automated processes.

BACKGROUND OF THE INVENTION

Commercial and research laboratory testing in the biomedical field often involves testing a plurality of liquid samples using similar processes. To increase efficiency in biomedical testing facilities, automation has been substantially incorporated into such testing. Automated test systems usually comprise a plurality of processing stations and a robotic means or other conveyance means to move test samples from one processing station to another.

For example, consider an automated test system that comprises a plurality of processing stations consisting of an incubator and two liquid handlers. Such an automated test system would typically also include a robotic arm, under the control of a computer, that moves samples between and among the incubator and the two liquid handlers.

Automated laboratory test systems also often incorporate multiple-well containers to store and transport test samples. Multiple-well containers are useful because in such testing, pluralities of samples are often processed in a substantially similar manner. The use of a multiple-well container allows several samples to be processed together and moved together from one processing station of an automated test processing system to another. For example, a commonly used multiple-well container is a ninety-six well microplate, which allows up to ninety-six samples to be moved and processed together.

While automated laboratory test systems are capable of nearly fully automating such tests, human intervention is often required in at least some processes. The most significant processing operation that typically requires human intervention is the container sealing, or plate sealing operation. Multiple-well containers, as well as other containers, must often be stored for some time period after the laboratory process is complete. In order to prevent contamination of the samples during this storage time, it is often desirable to cover and seal the container openings. Human intervention is typically required to seal the containers for storage.

Prior attempts have been made to automate the container sealing process. A prior art device developed by Sagian, Inc., assignee of the present invention, comprises an automated container sealing device that uses sealing tape to seal the containers. The device automatically dispenses tape having a width corresponding to the width of the container. The tape is dispensed until a length of tape covers the container. The device then employs a cutting mechanism to cut the sealing tape to fit the container. The tape is then further advanced in order to seal the next container.

While the above describe device fulfilled a need for an automated container sealer, the device was at times unable to obtain the level of reliable operation required of automated equipment. In particular, the automated advancement of and positioning of the tape itself was at times prone to misfeed, which would require human intervention to correct.

There exists a need, therefore, for a resilient container sealing device that further addresses the need for automated container sealing in an environment that requires extremely high levels of reliable operation.

SUMMARY OF THE INVENTION

The present invention fulfills the above stated needs, as well as others, by providing a automated container sealing apparatus that automatically removes seals from a backing and applies the seals to the container. The seals are pre-cut and have a size corresponding to the size of the container. Because the backing may be continuously advanced from a supply reel to a take-up reel, the seals are not prone to misfeed.

In an exemplary embodiment, the present invention includes an apparatus for sealing containers, the containers defined by a generally planar sealing surface and one or more receptacles, wherein each of the one or more receptacles include ail opening coplanar with and defining corresponding openings in the sealing surface. The container sealing apparatus comprises: a plurality of seals, each of said plurality of seals having a shape corresponding to the sealing surface, the plurality of seals peelably affixed to a length of backing; means for removing one of the plurality of seals from the backing and transporting the removed seal to a container; and means for causing the container to engage the removed seal, thereby sealing the container.

Because only the seal is attached to a backing, the present device is much less prone to misfeed than a device that relies on positioning a free end of a continuous roll of sealing tape. In the exemplary embodiment, the means for removing and transporting the removed seal includes a vacuum platen operable to generate a vacuum force urging the one of the plurality of seals toward the vacuum platen to effectuate removal of the seal from the backing.

The above features and advantages of the present invention, as well as others, will following detailed description and accompanying drawings.

BRIEF DESCRIPTION OF THE DRAW

DETAILED DESCRIPTION

Figure 1:
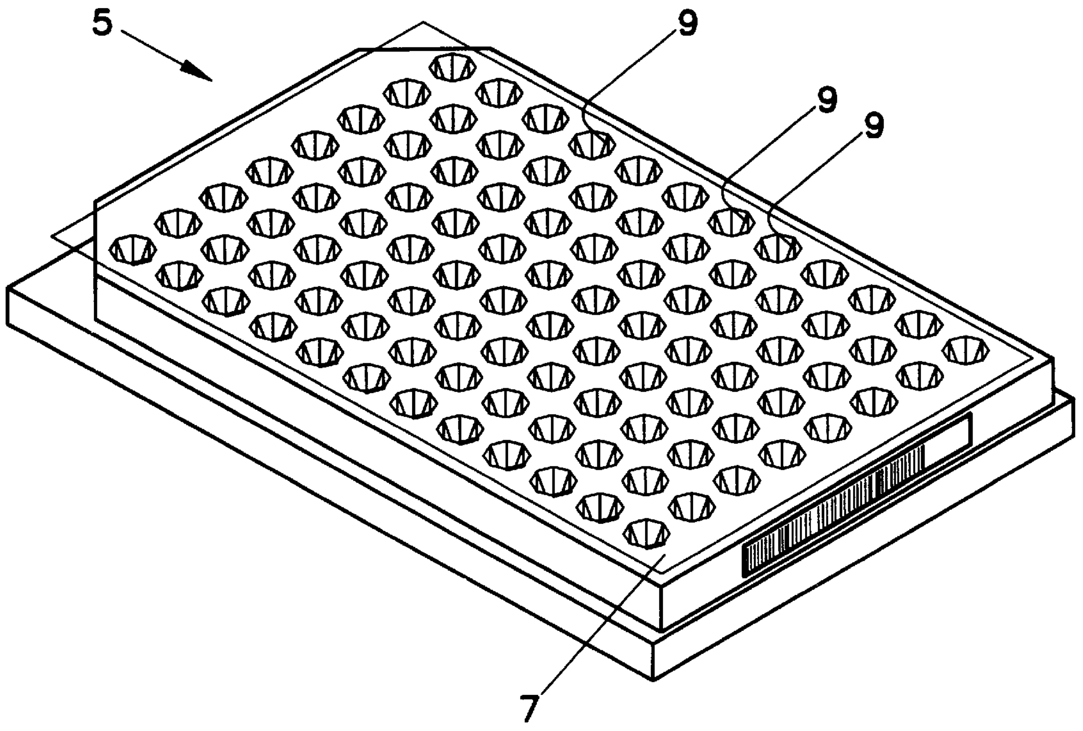
FIG. 1 (PRIOR ART)
FIG. 1 shows a typical multiple-well container which may be used in connection with the present invention.

FIG. 1 shows a perspective view of an exemplary multiple-well container which may be used in connection with the present invention. The multiple-well container 5 is defined by a generally planar sealing surface 7 and one or more receptacles 9, wherein each of the one or more receptacles 9 include an opening coplanar with and defining corresponding openings in the sealing surface 7. An example of such a container is a ninety-six well microplate generally known to those of ordinary skill in the art, wherein the ninety-six wells defining the receptacles.

Figure 2:
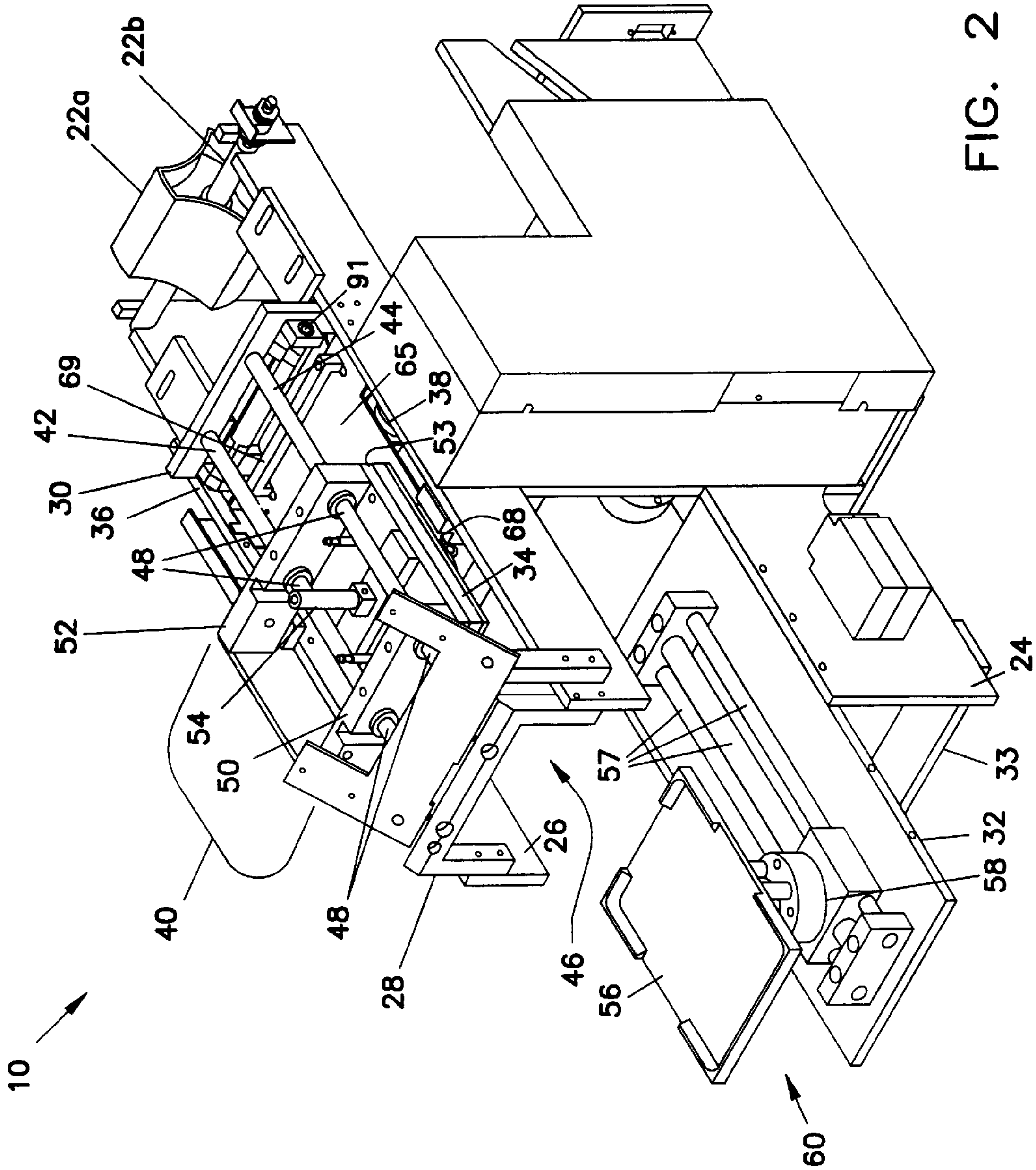
FIG. 2 shows a perspective view of an exemplary container sealing apparatus according to the present invention.
Figure 3:
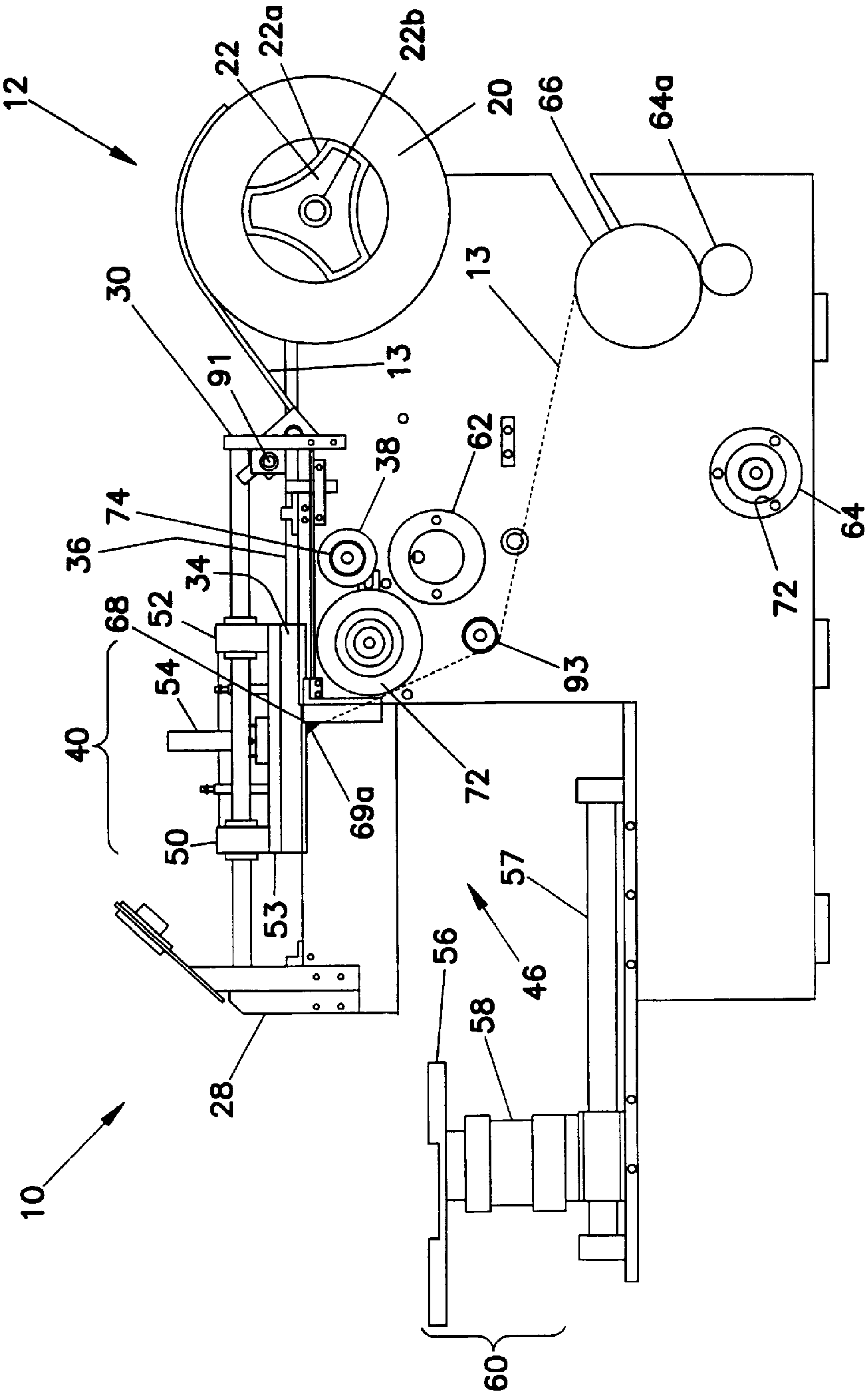
FIG. 3 shows a cutaway side view of the container sealing apparatus of FIG. 2.

The basic structure of an exemplary automated container sealing apparatus 10 is discussed in connection with FIGS. 2 and 3, which provide different views of the same apparatus. FIG. 2 shows a perspective view of the exemplary container sealing apparatus 10 and FIG. 3 shows a cutaway side view of the same apparatus.

In general, the container sealing apparatus 10 according to the present invention includes a housing, a plurality of seals 12, means for removing a seal from the backing and transporting the removed seal to a container, and means for causing the container to engage the seal. It is noted that the plurality of seals 12 are illustrated in FIG. 3, but not Fig. for purposes of clarity of exposition, as will be discussed further below.

The housing in the exemplary embodiment includes first and second side support plates 24 and 26, respectively, preferably made of steel. The side support plates 24 and 26 are spaced apart and supported by at least a first cross member 28, a second cross member 30 and bottom supports 32 and 33, also preferably made of steel. The exact dimensions of the housing are a matter of mechanical design choice and do not warrant further discussion herein.

The plurality of seals 12 are peelably affixed to a backing 13. A substantial portion of the backing 13 and the attached plurality of seals 12 are wound into a roll 20, similar to a roll of paper or postage stamps. The roll 20 is mounted onto a supply reel 22. FIG. 2 shows the supply reel 22 without the plurality of seals to further illustrate its structure. The supply reel 22 comprises a hub 22*a,* and an axle 22*b*. The axle is rotatably affixed to the first and second side support plates 24 and 26, respectively.

Figure 4:
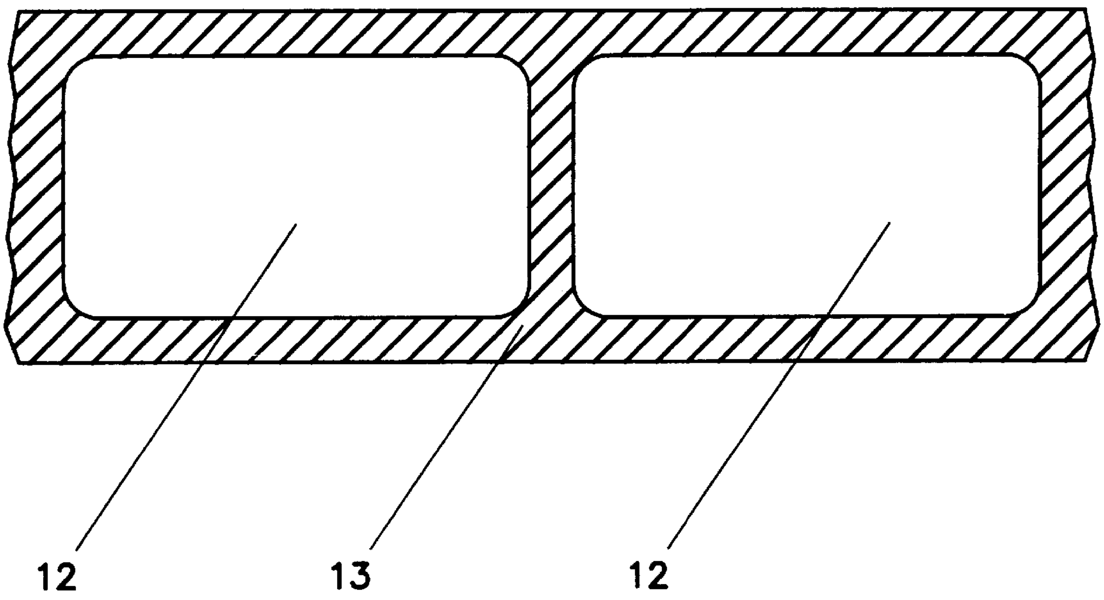
FIG. 4 shows a top elevational view of two of the plurality of seals of FIG. 3 affixed to a short length of backing in accordance with the present invention.

FIG. 4 shows a top elevational view of two of the plurality of seals 12 attached to a short length of backing 13. The two of the plurality of seals 12 each have a tacky side peelably affixed to the short length of backing 13. Preferably, each of the plurality of seals 12 are composed of polypropylene tape material, and are die cut to dimensions corresponding to the containers intended to be sealed. For use in connection with a ninety-six well microplate, each of the plurality of seals 12 is preferably die cut to a dimensions such that all ninety-six wells of a plate are covered by a single seal.

The means for removing a seal from the backing and transporting the removed seal to a container includes in the exemplary embodiment a vacuum platen 34 and a vacuum platen transport means. As described in further detail below in connection with FIG. 5, the vacuum platen 34 is a device that is operable to generate a vacuum force and is movably connected to the housing. The vacuum platen transport means operates to move the vacuum platen 34 between a location proximate the roll 20, known as the start location, and a remote sealing location indicated generally as the sealing location 46.

In the exemplary embodiment, the vacuum platen transport means includes a rack 36, a pinion assembly 38 associated therewith, a vacuum platen frame 40, and guide rails 42 and 44. The guide rails 42 and 44 extend from a location proximate the roll 20 to an oppositely located sealing location 46. The guide rails 42 and 44 are affixed at either end to the housing, and specifically between the first cross member 28 and the second cross member 30.

The vacuum platen frame 40 securedly affixes the rack 36 to the vacuum platen 34. The vacuum platen frame 40 includes a first cross support 50 and a second cross support 52 disposed generally above the vacuum platen 34 and extending from the rack 36 through substantially the entire width of the vacuum platen 34. The first cross support 50 and second cross support 52 include guide holes (and corresponding bushings) 48 for receiving guide rails 42 and 44 in a slidable relationship. A frame plate 53 having dimensions generally coincident with the dimensions of the vacuum platen 34 is affixed to and extends between the first cross support 50 and the second cross support 52. The vacuum platen 34 is movably affixed to the frame plate 53 by a hydraulic cylinder 54 that extends through the frame plate 53.

It will be noted that other vacuum platen transport means may be implemented. For example, other devices that can drive the vacuum platen 34 include hydraulic piston devices and electrical solenoid devices. In addition, appropriate supports and movement guides operable to support and effect movement of the vacuum platen 34 between a location proximate the roll 20 and the sealing location 46 may be readily devised by those of ordinary skill in the art.

The means for causing a container to engage a seal comprises a container support 56 and a hydraulic cylinder 58, which together comprise a container manipulator 60. The container manipulator 60 is located generally in the sealing location 46. The container manipulator 60 may include or be attached to a means for moving the container out of the vicinity of the sealing location so that the container may be exchanged with another container to be sealed. In the present embodiment, the container manipulator 60 is slidably attached to a plurality of rails 57. The container manipulator 60 is shown disposed in a location at which a microplate may be loaded. The container manipulator 60 traverses the plurality of rails 57 to the sealing location 46 in order for the sealing operation to take place.

In any event, the container support 56 is advantageously configured to receive a container to be sealed. The hydraulic cylinder 58 is movably connected to the container support 56 in order to raise and lower the container support 56. As will be discussed further below, the vertical movement of the container support 56 with a container thereon in towards the vacuum platen 34 effectuates the sealing of the container.

In addition to the above described components, the container sealing apparatus 10 further comprises a motor 62, an intermediate drive 64, a take-up drive 64*a,* a take-up reel 66, a separation element 68, a support plate 65, and a first position sensor 69. The intermediate drive 64 and the take-up reel 66 are rotatably connected to and extend between the first side support plate 24 and the second side support plate 26. The take-up reel 66 is a rotatable cylindrical object that receives and winds the backing 13 into a roll. The take-up drive 64*a* is rotatably connected between the first and second side support means 24 and 26, respectively, and is a frictional drive relationship with the take-up reel 66.

The motor 62 is operably connected to the intermediate drive 64 through an electrically-controlled clutch 70 and appropriate drive linkages, not shown. The intermediate drive 64 is operably connected through a clutch and brake assembly 72 and appropriate drive linkages, not shown, to the take-up drive 64*a*. The motor 62 is further connected to the vacuum platen transport means, and particularly, the pinion 38, through a pinion slip clutch 74 and appropriate linkages, not shown. The linkages that are not shown are preferably belt drives disposed on the opposite side of the container sealing apparatus.

The first position sensor 69 includes a fixture and an optical sensor device mounted thereon. The fixture of the first position sensor 69 is affixed to the housing in the vicinity of the roll 20, and particularly, to the support plate 65. The support plate 65 is secured to and extends between the first and second side support plates 24 and 26, respectively. The optical sensor device of first position sensor 69 is preferably oriented toward a portion of the path of travel of the backing 13 in order to detect optical variations in the backing 13 and the seals 12 attached thereto. The separation element 68 extends between the first side support plate 24 and the second side support plate 26 and preferably includes an inclined edge 69*a* (see FIG. 3) for providing a sharp angle in the travel path of the backing 13, as discussed further below.

Additional component structures of the container sealing apparatus 10 include a first roller assembly 91 and a second roller assembly 93. The first roller assembly 91 is rotatably attached, and preferably pivotally attached, to the second cross member 30, and extends substantially from the first side support plate 24 to the second side support plate 26. The second roller assembly 93 is rotatably attached to and between the first support plate 24 and the second support plate 26 proximate a location that is substantially between the separation element 68 and the take-up reel 66.

Figure 5:
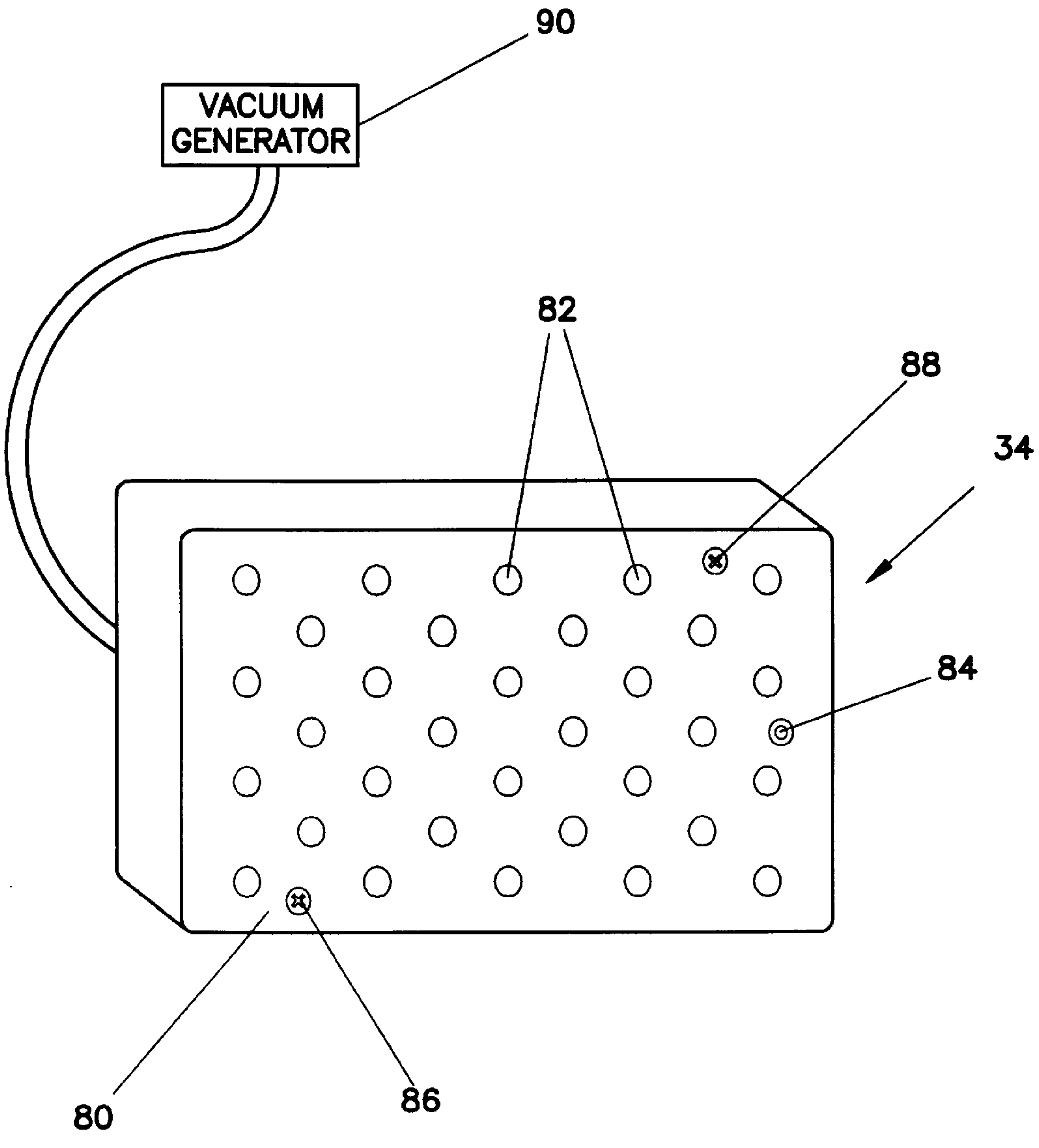
FIG. 5 shows the vacuum platen of the container sealing apparatus of FIG. 2.

FIG. 5 shows the vacuum platen 34 and a corresponding vacuum generator 90 of the container sealing apparatus 10 in further detail. The vacuum platen 34 includes an engagement surface 80 that is oriented in a downward direction in FIG. 2 and is therefore not visible in FIG. 2. The engagement surface 80 includes a plurality of vacuum holes 82, a second position sensor 84, and one or more pin cylinder openings. In the illustrated embodiment, engagement surface 80 includes pin cylinder openings corresponding to and aligned with first and second pin cylinders 86 and 88, respectively.

The vacuum platen 34 is connected to an external vacuum generator 90 that provides vacuum pressure to the vacuum platen 34. When vacuum pressure is so applied, the pressure within the vacuum platen 34 is lower than atmospheric pressure. As a result, the vacuum pressure generates a force having a direction towards the engagement surface 80. The first and second pin cylinders 86 and 88, respectively, when actuated provide a movement force away from the engagement surface 80 for the purpose of separating an object from the engagement surface 80 when the vacuum force is removed.

The second position sensor 84 is affixed within the vacuum platen 34 and is oriented outward the engagement surface 80. Like the first position sensor 69, the second position sensor 84 preferably includes an optical sensor. The second position sensor 84 is operable to detect the presence of an object, and provide a signal indicative of such detection.

Figure 6:
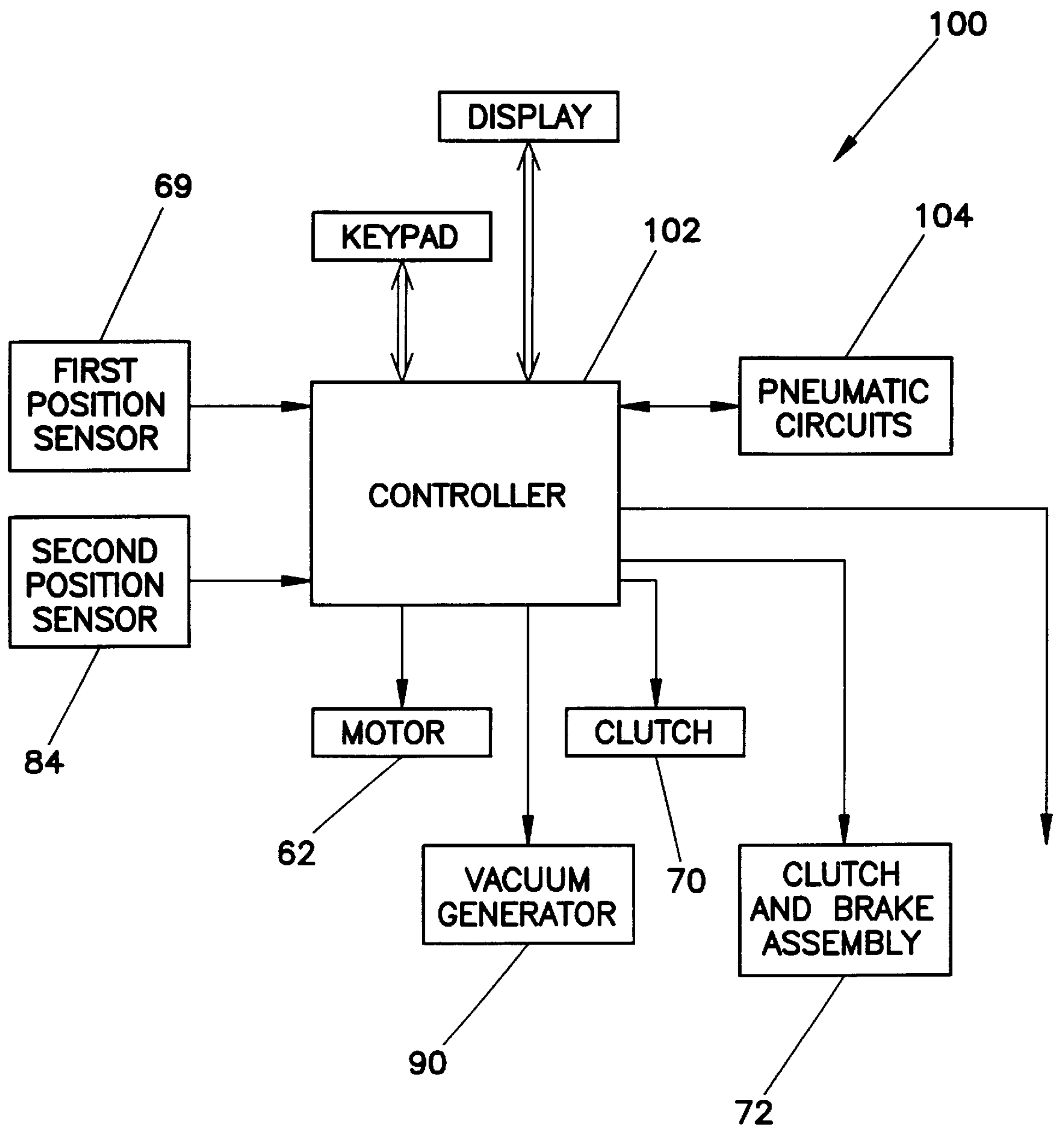
FIG. 6 shows a controller circuit for use in connection with the container sealing apparatus of the present invention.

FIG. 6 shows a block diagram of a controller circuit 100 operable to control the automatic operation of the container sealing apparatus 10 of FIG. 1. The controller circuit 100 includes a controller 102 that is operably connected to each of tile electrically controlled clutch 70, the brake and clutch assembly 72, the first position sensor 69, tile second position sensor 84, the vacuum generator 90, and the motor 62. In addition, the controller 102 is connected to a series of pneumatic circuits 104 that control the operation of the various pneumatic cylinders and pistons discussed above in connection with FIGS. 2 and 3.

In general, the controller 102 executes a program steps to control the operation of the container sealing apparatus 10 of FIGS. 2 and 3 in the manner described below. To this end, the controller 102 generally receives signals from the first position sensor 69 and the second position sensor 84, and provides control signals to the drive clutch 70, the brake and clutch assembly 72, the motor 62, the pneumatic circuits 104, and the vacuum generator 90 (see also FIGS. 2 and 5).

The controller circuit 100 also preferably includes a keypad 106 mid a display 108. The keypad 106 is operably connected to the controller 102 and provides a means by which an operator can control certain parameters of the operation of the container sealing apparatus 10 of FIG. 2. The display 108 is operably connected to the controller 102 and provides a means by which error messages or other status information may be provided to an operator.

The operation of the container sealing apparatus 10 is described below with reference generally to FIGS. 2 and 3, and otherwise as indicated. As an initial matter, the backing 13 must also be spooled or threaded between the supply reel 22 and the take-up reel 66. An operator may thread the backing 13 prior to automatic operation. As shown in FIG. 3 the backing is threaded from the roll 20, under the first roller assembly 91, over the support plate 65, over and around the separation element 68, tangentially adjacent to the second roller assembly 93, and onto the take-up reel 66. In such a configuration, the container sealing apparatus 10 is ready for operation.

In operation, a first container, not shown but which may suitably be the multiple-well container 5 of FIG. 1, is positioned on the container support 56 while the hydraulic piston 58 is in a retracted position. If the container manipulator 60 is stationary, then the first container must be placed onto the container support 56 while the container manipulator is located within the sealing location 46. If, however, the container manipulator 60 is movable, as illustrated in FIG. 2 and FIG. 3, then the first container may be loaded onto the container support 56 in another location. The container manipulator 60 may then be positioned within the sealing location 46. An external device such as a robotic arm, conveyer, or carousel type loader may be used to load containers onto the container manipulator 60. In such a case, the controller 102 may control the positioning of the first container onto the container support 56.

In any event, once the first container is located in the sealing location 46, the controller 102 (see FIG. 6) provides the appropriate control signals to cause the operations and method described below to take place.

Initially, the vacuum platen 34, as well as the vacuum platen frame 40 is located at the start position. The start position is defined as a location in which the vacuum platen frame 40 is substantially adjacent to and nearly in contact with the second cross member 30 of the housing. A first seal consisting of one of the plurality of seals 12 is located generally below and in registration with the vacuum platen 34.

The vacuum platen 34 then engages the first seal. To this end, the vacuum generator 90 (see FIG. 5) creates a vacuum within the vacuum platen 34 such the pressure within the vacuum platen 34 is lower than the external atmosphere. Concurrently, the hydraulic cylinder 54 of the vacuum platen frame 40 extends, causing the vacuum platen 34 to move vertically toward the first seal. The combination of the vertical motion of the vacuum platen 34 and the vacuum force causes the first seal to engage the engagement surface 80 (see FIG. 5) of the vacuum platen 34.

Next, the motor 62 energizes, and the electrically-controlled Clutch 70 engages, thereby causing rotational motion of the intermediate drive 64 and the take-up drive 64*a*. The rotation of the take-up drive 64*a* rotates the take-up reel 66 to advance the backing 13 (including the first seal). In particular, the take-up reel 66 causes the portion of the backing 13 to which first seal is attached to move in a direction toward the separation element 68. The energized motor 62 concurrently causes the pinion assembly 38 and rack 36 to move the vacuum platen 34. The rack 36 and pinion assembly 38 move the vacuum platen 34 in substantially the same direction and speed as the backing 13. During such movement, the vacuum platen 34 maintains vacuum engagement of the first seal.

While such movement of the backing 13 is taking place, a second seal consisting of one of the plurality of seals 12 moves off of the roll 20 and through the first roller assembly 91.

The coordinated motion of the vacuum platen 34 and the portion of the backing 13 containing the first seal continues as that portion of the backing 13 engages the separation element 68. At that point, the force of the second roller assembly 93 and the take-up reel 66 acts in coordination with the separation element 68 to cause that portion of the backing 13 to move in a different angular direction than the movement of the vacuum platen 34. The vacuum engagement of the first seal with the vacuum platen 34 causes the first seal to be separated from the backing 13 and remain engaged with the vacuum platen 34.

The motor 62 continues to drive the pinion 38 until the vacuum platen 34 reaches the sealing location 46. Concurrently, the motor 62 continues to drive the intermediate drive 64 until the second seal is properly registered for the next sealing operation.

In particular, while the backing 13 is advancing, the first position sensor 69 detects when the second seal is properly registered. In the exemplary embodiment discussed herein, the first position sensor 69 is an optical sensor, and preferably the backing 13 includes optically detectable indicia of registration information associated with each of the plurality of seals. The first position sensor 69 detects the indicia, and provides a signal indicative of such information to the controller 102 (see FIG. 6). The controller 102, using the information in the provided signal, determines the position of the second seal.

When the controller 102 determines that the second seal is properly registered, the controller 102 causes the electrically-controlled clutch 70 to disengage, which in turn stops the movement of the intermediate drive 64, the take-up drive 64*a,* and the take-up reel 66. For further positioning control, the controller 102 causes the brake and clutch assembly 72 to apply braking force to the intermediate drive 64. The disengagement of the electrically controlled clutch allows the backing 13 ceases movement while the motor 62 continues to operate.

In the meantime, when the vacuum platen 34 reaches the vicinity of the sealing location 46, the controller 102 (see FIG. 6) causes the motor 62 to de-energize, which in turn causes the vacuum platen 34 to cease movement.

The hydraulic piston 58 of the container manipulator 60 then actuates, moving the container support 56 (and the first container) towards the vacuum platen 34 and the first seal. It is noted that, at this point, the tacky side of the first seal is disposed toward the approaching first container. The hydraulic piston 58 forces the container support 56 upwards until the first seal engages the first container. Once the first seal engages the first container, the vacuum generator 90 (see FIG. 5) removes the vacuum.

The hydraulic piston 58 then retracts, causing the container support 56 to move away from the vacuum platen 34. The tackiness of the first seal causes the first seal to remain affixed to the first container. The first container remains on the container support 56 as it moves away from the vacuum platen 34. However, static electricity may tend to inhibit separation of the first container from the vacuum platen 34 as the hydraulic piston 58 retracts. Referring to FIG. 5, provision is made in the exemplary embodiment to overcome any such static electricity problems. Specifically, positive air pressure is forced outward through the vacuum holes 82 and the first mid second pin cylinders 86 and 88 are actuated. Actuation of the first and second pin cylinders 86 and 88 causes the pin cylinders 86 and 88 to extend outward from the engagement surface 80, thereby forcing the first seal separate therefrom. The coordinated action of the positive air and the pin cylinders 86 and 88 should eliminate any problems caused by static electricity.

Referring again to FIGS. 2 and 3, the first container, once sealed, may be moved from the container support 56 by suitable means and replaced by a second container to be scaled. The vacuum platen 34 must then be returned to the start position.

To return the vacuum platen 34 to the start position, the hydraulic cylinder 54 first retracts, which raises the vacuum platen 34 towards the frame plate 53. The motor 62 then energizes in a manner to rotate in a direction opposite to the direction used to advance the backing 13. So energized, the motor 62 moves the vacuum platen 34 toward the sealing location 46. The electrically-controlled clutch 70 remains disengaged to prevent movement of the backing 13. The vacuum platen 34 continues to move until it is registered in the start position. To effect such registration, the second position sensor 84 (see FIG. 5) detects indicia on the backing 13 which is used by the controller 102 (see FIG. 6) to determine position information. When the controller 102 (see FIG. 6) determines that the vacuum platen 34 is properly registered, the motor 62 de-energizes and movement of the vacuum platen 34 ceases.

Once the second seal, the vacuum platen 34, and the second container are properly positioned, the electrically-controlled clutch 70 is engaged, the brake of the brake and clutch assembly 72 is disengaged, and the operations and method described above may be repeated.

It has been observed that the container sealing apparatus according to the present invention exhibits highly reliable operation. In contrast to the prior art, the present invention does not rely feeding a free end of tacky tape through and then cutting the tacky tape to fit the container. By contrast, the seals according to the present invention are pre-cut and are guided through the mechanism Substantially while attached to a backing. Because the backing is constantly attached at both ends, the possibility of misfeed is substantially reduced if not totally eliminated. It is also noted that in contrast to such prior art devices, the tacky portion of the sealing medium does not come into contact with any elements of the apparatus.

It will be appreciated that the above described embodiments are merely illustrative. Those of ordinary skill in the art may readily devise their own implementations that incorporate the principles of the present invention and fall within the spirit and scope thereof.

I claim:

1. A method for sealing containers comprising:

a) providing a multiple-well container having a generally planar sealing surface and one or more receptacles, each of the one or more receptacles including an opening coplanar with and defining corresponding openings in the sealing surface;

b) providing a plurality of seals, each of the plurality of seals having a shape corresponding to the sealing surface;

c) bringing a vacuum platen having an engagement surface and a vacuum force into contact with a container seal from one of the plurality of seals, the vacuum force holding the container seal against the engagement surface;

d) bringing the container seal held by the vacuum platen into engagement with the multiple-well container such that the container seal adheres to the generally planar surface of the multiple well container.

2. The method of claim 1 wherein the multiple-well container is moved toward the vacuum platen and container seal to bring the container seal into engagement with the multiple-well container.

3. The method of claim 1 wherein each of the plurality of seals is affixed to a length of backing and the container seal is removed from the length of backing following engagement of the vacuum platen with the container seal.

4. The method of claim 1 wherein a positive air pressure is forced through the vacuum platen following engagement of the container seal with the multiple well container to remove the vacuum force and assist in removal of the container seal from the vacuum platen.

5. The method of claim 1 wherein the plurality of seals are peelably affixed to a backing before container seal is brought into contact with the vacuum platen, and the container seal is removed from the backing and held exclusively by the vacuum platen after the container seal passes over a separation element.

6. The method of claim 1 wherein the multiple-well container includes ninety-six receptacles.

7. A method for sealing a microplate comprising the steps of:

a) placing a microplate in a microplate support, the microplate having a sealing surface and one or more receptacles, each of the one or more receptacles including an opening coplanar with and defining corresponding openings in the sealing surface;

b) placing a seal on a vacuum platen and holding the seal by a vacuum force created by the vacuum platen, the seal having a shape corresponding to the sealing surface, the seal also having a tacky side for engagement with the sealing surface and a non-tacky side for engagement with the vacuum platen;

c) moving the seal and vacuum platen to a sealing location; and d) bringing the tacky side of the seal into contact with the microplate sealing surface at the sealing location.

8. The method of claim 7 wherein step d) is accomplished by moving the microplate support toward the vacuum platen.

9. The method of claim 7 further comprising the step of removing the vacuum force following step d) and forcing a positive air pressure through the vacuum platen to assist in removal of the seal from the vacuum platen.

10. The method of claim 7 wherein the seal is peelably affixed to a backing before the seal is placed on the vacuum platen in step b), and movement of the seal and vacuum platen in step c) moves the seal over a separation element and causes the seal to be removed from the backing such that the seal is held exclusively by the vacuum platen.

11. The method of claim 7 wherein the multiple-well container includes ninety-six receptacles.

12. An apparatus for sealing containers, the apparatus comprising:

a) a microplate support;

b) a microplate situated within the microplate support, the microplate having a generally planar sealing surface and one or more receptacles, each of the one or more receptacles including an opening coplanar with and defining corresponding openings in the sealing surface;

c) a moveable vacuum platen located a distance above the microplate, the vacuum platen having an engagement surface and a vacuum force;

d) a seal held by the vacuum force to the engagement surface of the vacuum platen, the seal having a shape corresponding to the sealing surface and a tacky side for engagement with the sealing surface;

e) a means for moving the vacuum platen to a sealing location where the tacky side of the seal is brought into contact with the microplate sealing surface.

13. The apparatus of claim 12 wherein the seal is contacted with the microplate sealing surface following movement of the microplate support towards the vacuum platen.

14. The apparatus of claim 12 wherein the vacuum platen is capable of removing the vacuum force and providing positive air pressure to assist in removal of the seal from the vacuum platen.

* * * * *